US012668719B2

(12) United States Patent (10) Patent No.: US 12,668,719 B2

Hu (45) Date of Patent: Jun. 30, 2026

(54) ADHESIVE MATERIAL AND ELECTROCHEMICAL APPARATUS CONTAINING SAME

(71) Applicant: Ningde Amperex Technology Limited, Ningde (CN)

(72) Inventor: Kewen Hu, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 118 days.

(21) Appl. No.: 18/599,788

(22) Filed: Mar. 8, 2024

(65) Prior Publication Data

US 2024/0218209 A1 Jul. 4, 2024

Related U.S. Application Data

(63) Continuation of application No. PCT/CN2021/117621, filed on Sep. 10, 2021.

(51) Int. Cl.
C09J 7/24 (2018.01)

(52) U.S. Cl.
CPC ........... C09J 7/241 (2018.01); C09J 2203/33 (2013.01); C09J 2301/41 (2020.08)

(58) Field of Classification Search
CPC .. C09J 7/241; C09J 7/10; H01M 4/62; H01M 10/04; H01M 10/0525; H01M 50/198
See application file for complete search history.

(56) References Cited

U.S. PATENT DOCUMENTS

| | | | | |
|---|---|---|---|---|
| 2010/0279125 A1* | 11/2010 | Buyuktanir | ............ | C09K 19/60 |
| | | | | 264/494 |
| 2013/0316220 A1* | 11/2013 | Lim | .................... | H01M 50/451 |
| | | | | 429/144 |
| 2016/0237324 A1* | 8/2016 | Jang | ............................ | C09J 7/38 |
| 2019/0267253 A1* | 8/2019 | Stathakis | ................ | H01L 23/24 |
| 2021/0002524 A1* | 1/2021 | Seo | ......................... | C09J 133/14 |
| 2021/0057702 A1* | 2/2021 | Seok | ................... | H01M 50/446 |

(Continued)

FOREIGN PATENT DOCUMENTS

| | | | |
|---|---|---|---|
| CN | 103254817 A | * | 8/2013 |
| CN | 105449255 A | | 3/2016 |
| CN | 106497437 A | | 3/2017 |

(Continued)

OTHER PUBLICATIONS

Translation of CN 105449255 B (Year: 2019).*

(Continued)

*Primary Examiner* — Sue A Purvis

(74) *Attorney, Agent, or Firm* — Maier & Maier, PLLC

(57) ABSTRACT

An adhesive material includes an adhesive film, where the adhesive film includes a bonding layer and a first functional layer. The first functional layer includes a styrene-isoprene-styrene rubber and an additive, where the additive includes a wax or a polymer surfactant. With the first functional layer having the styrene-isoprene-styrene rubber and the additive provided, the adhesive material is capable of adjusting bonding strengths on both surfaces of the adhesive film through heat treatment and/or pressure treatment, and avoiding permeation and/or shifting between layers in the adhesive film, thereby improving the safety performance of the electrochemical apparatus.

18 Claims, 1 Drawing Sheet

(56)     References Cited

U.S. PATENT DOCUMENTS

2021/0151750  A1 *    5/2021   Chen ..................... H01M 4/623

FOREIGN PATENT DOCUMENTS

| CN | 107987759 | A | * | 5/2018 | ........... C09J 151/06 |
| CN | 208722928 | U | * | 4/2019 | |
| CN | 111136970 | A | * | 5/2020 | ......... H01M 50/124 |
| CN | 111154431 | A | | 5/2020 | |
| CN | 112542626 | A | | 3/2021 | |
| CN | 112708235 | A | | 4/2021 | |
| CN | 113306273 | A | | 8/2021 | |
| JP | 2017128651 | A | | 7/2017 | |
| KR | 20160110441 | A | * | 9/2016 | ........... B32B 37/153 |
| WO | WO-2010027507 | A2 | * | 3/2010 | ............... B32B 7/12 |
| WO | WO-2012114776 | A1 | * | 8/2012 | ......... H01M 50/121 |

OTHER PUBLICATIONS

Translation of CN 111136970 A (Year: 2020).*
Translation (Year: 2019).*
Translation (Year: 2020).*
International Search Report issued on Apr. 26, 2022, in corresponding International Application No. PCT/CN2021/117621, 8 pages.

* cited by examiner

ADHESIVE MATERIAL AND ELECTROCHEMICAL APPARATUS CONTAINING SAME

CROSS REFERENCE TO THE RELATED APPLICATIONS

This application is a continuation under 35 U.S.C. § 120 of international patent application PCT/CN2021/117621 filed on Sep. 10, 2021, the entire content of which is incorporated herein by reference.

TECHNICAL FIELD

This application relates to the field of interfacial bonding and to the field of energy storage, specifically to an adhesive material having a substrate-free adhesive film and an electrochemical apparatus containing the same, and in particular to a lithium-ion battery.

BACKGROUND

With the development of technologies and the increasing demands for mobile apparatuses, demands for electrochemical apparatuses (for example, lithium-ion batteries) have increased significantly. With the adoption of electrode assemblies with high energy density and high discharge performance in electrochemical apparatuses, the safety requirements of other assemblies in electrochemical apparatuses have also relatively increased.

In actual use, electrode assemblies in electrochemical apparatuses often need to be secured in housings/enclosures through adhesive materials. A currently used adhesive material containing a substrate and an bonding layer has at least the following problems: (1) the substrate is thick, resulting in a loss of energy density, and slit burrs on the substrate have the risk of puncturing a separator; and (2) the bonding layer might fall off from the substrate, failing to effectively bind an electrode assembly, and in severe cases, resulting in the interface between the electrode assembly and the housing being stripped, thereby losing protective effect. The substrate-free adhesive film can solve the above problems and has been gradually commercialized in actual production.

However, for an existing substrate-free adhesive film, an adhesive surface and a hot-melt layer are prone to interpenetrate each other, resulting in the adhesive film having a large viscosity on a surface at room temperature, which is unfavorable for the preparation of electrochemical apparatuses. In addition, under a condition of being subjected to an external force, due to a significant difference in adhesive interface forces between a hot-melt layer and an bonding layer, interface damage can occur only between an adhesive film and its adherent (for example, a housing of the electrochemical apparatus such as an aluminum foil), which in turn threatens the safety performance of the electrochemical apparatus.

In view of this, it is necessary to study and improve adhesive materials so as to enhance use safety of electrochemical apparatuses containing such improved adhesive materials.

SUMMARY

Embodiments of this application provide an adhesive material having a substrate-free adhesive film and an electrochemical apparatus containing the same, so as to resolve at least one problem existing in the related art to at least some extent.

According to an aspect of this application, this application provides an adhesive material, where the adhesive material includes an adhesive film. The adhesive film includes a bonding layer and a first functional layer. The first functional layer includes a styrene-isoprene-styrene rubber and an additive, where the additive includes a wax or a polymer surfactant. With the first functional layer having the styrene-isoprene-styrene rubber and the additive provided, the adhesive material of this application is capable of adjusting bonding strengths on both surfaces of the adhesive film thereof through heat treatment and/or pressure treatment, and avoiding permeation and/or shifting between layers in the adhesive film, thereby improving the safety performance of the electrochemical apparatus.

According to some embodiments of this application, the first functional layer has a bonding strength of 0.01 N/mm to 0.05 N/mm at 23° C. to 26° C.

According to some embodiments of this application, the first functional layer has a bonding strength of 0.05 N/mm to 1.0 N/mm after heat-pressure treatment.

According to some embodiments of this application, the adhesive material further includes a release paper. The release paper is provided on a surface of the bonding layer facing away from the first functional layer.

According to another aspect of this application, this application provides an electrochemical apparatus, where the electrochemical apparatus includes an electrode assembly, a housing, and the foregoing adhesive film. The bonding layer of the adhesive film is provided on an outer surface of the electrode assembly. The first functional layer of the adhesive film is provided on a surface of the bonding layer facing away from the electrode assembly and is in contact with an inner surface of the housing. The adhesive film fixed the electrode assembly to the housing.

According to some embodiments of this application, the bonding layer has a bonding strength of 0.05 N/mm to 1.0 N/mm to the outer surface of the electrode assembly, and the first functional layer has a bonding strength of 0.05 N/mm to 1.0 N/mm to the inner surface of the housing.

According to some embodiments of this application, a mass ratio of the additive is from 0.5% to 5.0% based on a total mass of the first functional layer.

According to some embodiments of this application, the mass ratio of the additive is preferably from 1.0% to 4.0%.

According to some embodiments of this application, the styrene-isoprene-styrene rubber includes one or more of styrene-butadiene rubber, nitrile rubber, butyl rubber, chloroprene rubber, polysulfide rubber, polyurethane rubber, polyacrylate rubber, chlorosulfonated polyethylene rubber, silicone rubber, fluorine rubber, butadiene rubber, isoprene rubber, or ethylene propylene rubber.

According to some embodiments of this application, the wax includes one or more of paraffin wax, sasol wax, polyethylene wax, or polypropylene wax.

According to some embodiments of this application, the polymer surfactant includes one or more of the following components: polyacrylamide, polyacrylamide copolymer, polyacrylic acid, polyacrylic acid copolymer, polybutyric acid, polybutyric acid copolymer, maleic anhydride copolymer, polyethyleneimine, polyimideamide, polymethylene lymide derivatives, quaternized polyacrylamide, polydimethylamine cyclopropane, polyvinyl alcohol, polyvinyl alcohol esterification products, polyvinyl alcohol acetalization products, or polyethylene oxide-propylene oxide.

According to some embodiments of this application, the bonding layer includes one or more of acrylic, polypropylene, styrene-isoprene-styrene (SIS) rubber, polyethylene, or polyamide.

According to some embodiments of this application, the bonding layer has a dyne value of 30 mN/m to 48 mN/m, and the first functional layer has a dyne value of 30 mN/m to 48 mN/m.

According to some embodiments of this application, the bonding layer has a thickness of 1 μm to 15 μm, and the first functional layer has a thickness of 1 μm to 15 μm, where the thickness of the first functional layer is greater than or equal to the thickness of the bonding layer.

According to some embodiments of this application, the adhesive film further includes a second functional layer, the second functional layer being provided between the bonding layer and the first functional layer, where the second functional layer includes a heat conduction filler, and the heat conduction filler has a percentage of 5% to 50% based on a total mass of the second functional layer.

According to some embodiments of this application, the heat conduction filler has a percentage of 20% to 40%.

According to some embodiments of this application, the heat conduction filler includes one or more of diamond, graphite, graphene, alumina, boron nitride, silicon dioxide, or calcium oxide.

According to some embodiments of this application, the second functional layer has a thickness of 5 μm to 20 μm.

In the adhesive material of this application, the substrate of the adhesive material is eliminated, which can reduce the thickness of the adhesive material so as to increase the energy density, eliminate the phenomenon of the bonding layer falling off from the substrate, ensure the fixation of the electrode assembly, and improve the drop resistance of the electrochemical apparatus. In addition, components of each layer of the adhesive film are set, such that the substrate-free adhesive film of this application can ensure that the first functional layer and the bonding layer do not penetrate/migrate to each other's surfaces before and after the heat/pressure treatment, so as to optimize the preparation process of the electrochemical apparatus. Under a strong external force, the adhesive film in the electrochemical apparatus itself will undergo cohesive failure at the interface between the first functional layer and the bonding layer to release the stress, such that no interface failure between the adhesive film and its adherend will occur, which avoids failure phenomena such as voltage drop, leakage of liquid, heat, smoke, and fire of the electrochemical apparatus caused by the tearing of the aluminum foil, and further enhances the safety of the lithium-ion electrochemical apparatus.

Additional aspects and advantages of some embodiments of this application are partly described and presented in subsequent descriptions, or explained by implementation of some embodiments of this application.

BRIEF DESCRIPTION OF DRAWINGS

To describe embodiments of this application, the following briefly describes the accompanying drawings required for describing the embodiments of this application or the prior art. Apparently, the accompanying drawings described below are merely some embodiments of this application. Persons skilled in the art may still derive drawings for other embodiments from structures shown in these accompanying drawings without creative efforts.

DETAILED DESCRIPTION

Figure 1:
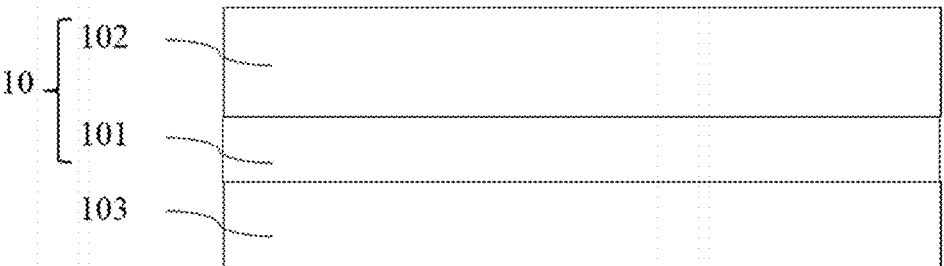
FIG. 1 is a schematic diagram of a cross-sectional structure of an adhesive material according to some embodiments of this application.

Some embodiments of this application are described in detail below. Some embodiments of this application should not be construed as limitations on this application.

Unless otherwise expressly indicated, the following terms used in this specification have the meanings described below.

The terms "about", "roughly", "substantially", and "approximately" used herein are intended to describe and represent small variations. When used in combination with an event or a circumstance, the term may refer to an example in which the exact event or circumstance occurs or an example in which an extremely similar event or circumstance occurs. For example, when used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two numerical values is less than or equal to ±10% of an average numerical value of the numerical values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two numerical values may be considered "roughly" the same.

In the description of embodiments and claims, a list of items preceded by the terms such as "at least one of", "at least one piece of", "at least one type of", "one or more of", or other similar terms may mean any combination of the listed items. For example, if items A and B are listed, the phrase "one or more of A and B" means only A; only B; or A and B. In another example, if items A, B, and C are listed, the phrase "one or more of A, B, and C" means only A; only B; only C; A and B (exclusive of C); A and C (exclusive of B); B and C (exclusive of A); or all of A, B, and C. The item A may contain a single element or a plurality of elements. The item B may include a single element or a plurality of elements. The item C may include a single element or a plurality of elements.

In addition, for ease of description, "first", "second", "third", and the like may be used to distinguish between different components in one drawing or a series of drawings in this specification. Unless otherwise specified or limited, "first", "second", "third", and the like are not intended to describe corresponding components.

In the art, an adhesive material used to secure an electrochemical apparatus and engage an electrode assembly of the electrochemical apparatus with a housing is generally made of an adhesive material including a substrate and an bonding layer. However, due to a thickness of the substrate itself, the use of the adhesive material to engage the electrode assembly with the housing increases the overall thickness of the electrochemical apparatus, which in turn leads to a loss of overall energy density of the electrochemical apparatus. In addition, the material of the substrate has the potential to generate burrs in the slitting process and puncture a separator of the electrode assembly, which potentially affects the safety of the electrochemical apparatus. In addition, because a bonding strength of the bonding layer to the substrate is not the same as a bonding strength of the bonding layer to its adherent, the bonding layer can be detached from the contact between the bonding layer and the substrate, such that the electrode assembly cannot be effectively secured. In severe cases, due to the relative motion between the electrode assembly and the housing, the head and tail portions are severely worn, which is prone to cause the electrochemical apparatus to heat up, smoke, or even catch fire.

Chinese patent CN105449255B discloses a substrate-free adhesive film. The substrate-free adhesive includes an bonding layer and a functional layer (hot-melt layer) of a composite material containing a pressure-sensitive adhesive possessing initial viscosity or a pressure-sensitive adhesive not possessing initial viscosity and a temperature-sensitive adhesive not possessing viscosity at room temperature. It can maintain unbound with a packaging shell (housing) before heat treatment and/or pressure treatment, but can be bonded together with the housing after a pressure is applied, so as to optimize the packaging process of the electrode assembly. However, a stable interface cannot be formed between the bonding layer and the hot-melt layer of the substrate-free adhesive film, and a material of the bonding layer and a material of the hot-melt layer are prone to penetrate into each other, which causes the viscosity of the surface of the hot-melt layer of the substrate-free adhesive film to increase automatically after the substrate-free adhesive film is placed at room temperature for a period of time, and is not conducive to the packaging process of the electrode assembly. In addition, because a bonding strength of the surface of the bonding layer to its adherend is greater than a bonding strength of the surface of the hot-melt layer to its adherend, this results in the interface damage of the substrate-free adhesive film often occurring between the surface of the functional layer and its adherend when subjected to an external force. In severe cases, the interface damage of the film can lead to the aluminum foil of the housing being torn or broken, which in turn threatens the safety of the electrochemical apparatus.

In view of the preceding problems, according to an aspect of this application, an embodiment of this application provides a substrate-free adhesive film. A wax and/or a polymer surfactant are added to the functional layer, such that the substrate-free adhesive film can efficiently maintain the interface between the bonding layer and the functional layer, and reduce the mutual penetration between the bonding layer and the functional layer, so as to optimize the packaging process of the electrode assembly. In addition, when being subjected to an external force, the adhesive film of this application can undergo cohesive failure at the interface between its own bonding layer and functional layer to buffer the stress, such that the adhesive film will not damage the bonding interface of its adherent. Under a strong external force, the adhesive film of this application can be peeled off at the interface between its own bonding layer and functional layer, thereby protecting the integrity of each of the electrode assembly and the housing, and avoiding rupture damage to the electrochemical apparatus.

FIG. 1 is a schematic cross-sectional diagram of an adhesive material according to some embodiments of this application.

As shown in FIG. 1, this application provides an adhesive material. The adhesive material includes an adhesive film 10, where the adhesive film 10 is a substrate-free adhesive film, and includes a bonding layer 101 and a first functional layer 102. The first functional layer 102 includes a styrene-isoprene-styrene rubber and an additive, where the additive includes one or more of a wax or a polymer surfactant.

The first functional layer 102 is a heat-sensitive and/or pressure-sensitive layer, to be specific, after the first functional layer 102 undergoes heat treatment and/or pressure treatment, its bonding strength to a contact object (for example, an aluminum foil and a PP layer of a packaging bag) will become higher. In some embodiments, the first functional layer 102 has a bonding strength of 0.01 N/mm to 0.05 N/mm at room temperature before heat treatment and/or pressure treatment, where the term "room temperature" is used herein to denote a temperature in a range of 23° C. to 26° C. In some embodiments, the first functional layer 102 has a bonding strength of 0.05 N/mm to 1.0 N/mm after heat treatment and/or pressure treatment. As used herein, the term "heat treatment" means that a sample is exposed to or placed in an object/environment at a relatively high temperature (above the room temperature) for a period of time, the term "pressure treatment" means that a sample is subjected to a certain amount of pressure for a period of time, and the term "heat-pressure treatment" means that a sample is exposed to or placed in an object/environment at a relatively high temperature (above the room temperature) for a period of time and is also subjected to a certain amount of pressure. Persons skilled in the art can adjust parameters of the "heat treatment", "pressure treatment", or "heat-pressure treatment" according to the actual material and viscosity requirements. In some embodiments, the first functional layer 102 has a bonding strength of 0.05 N/mm to 1.0 N/mm after the heat-pressure treatment, where a setting temperature of the heat-pressure treatment is from 55° C. to 85° C., an applied pressure is from 0.3 MPa to 2 MPa, and a time is from 5 mins to 120 mins.

The term "bonding strength" herein refers to a vertical peeling strength produced when a bonding sample and a to-be-bonded sample are peeled off by an external force, which can be obtained in accordance with the peeling strength test standard GB/T2792-2014. Details of the bonding strength test are described in the specific embodiments section below.

In some embodiments, a mass ratio of the additive in the first functional layer 102 is from 0.5% to 5.0% based on a total mass of the first functional layer 102. In some embodiments, the mass ratio of the additive is approximately 0.5%, 1.0%, 1.5%, 2.0%, 2.5%, 3.0%, 3.5%, 4.0%, 4.5%, or 5.0%, or in a numerical range defined by any two of the foregoing values. The wax and/or polymeric surfactant in the additive have low-polarity and anti-erosion properties, and have a high polarity binding strength to the styrene-isoprene-styrene rubber of the first functional layer 102 and have no affinity for the bonding layer material, which in turn serves to prevent mutual penetration between the first functional layer 102 and the bonding layer 101. In some embodiments, the first functional layer 102 can adjust its bonding strength to a housing material by adjusting the composition and mass ratio of the additive. In some embodiments, the mass ratio of the additive in the first functional layer 102 is from 1.0% to 4.0% so as to have an optimal cohesive structure failure effect.

In some embodiments, the wax in the additive includes one or more of paraffin wax, sasol wax, polyethylene wax, or polypropylene wax. In some embodiments, the polyethylene wax is added to the first functional layer 102, where the polyethylene wax has excellent cold resistance, heat resistance, chemical resistance, and wear resistance, which can further improve the processing performance of the first functional layer. In some embodiments, the polypropylene wax is added to the first functional layer 102, where the polypropylene wax has the characteristics such as high melting point, low melting degree, good lubricity, and good dispersion, which can make the first functional layer more easily distributed evenly. In some embodiments, the sasol wax is added to the first functional layer 102, where a shorter side chain of the sasol wax is present with a long-chain aliphatic hydrocarbon, which has better electrical conductivity, higher melting point, and hardness, and can improve the heat resistance of the first functional layer. In some embodiments, the paraffin wax is added to the first functional layer 102, where the paraffin wax is a mixture of hydrocarbons with carbon atoms 18 to 30, containing 80% to 95% of linear-chain alkanes, less than 20% of alkanes with individual branch chains and monocyclic cycloalkanes with long side chains. In some embodiments, the chemical structural formula of the paraffin wax is as follows:

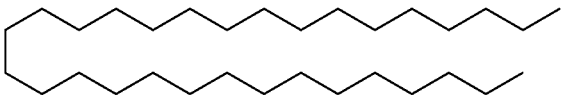 [SMILES: CCCCCCCCCCCCCCCCCCCCCCCCCCCCCCC]

In some embodiments, the polymer surfactant in the additive includes one or more of the following components: polyacrylamide, polyacrylamide copolymer, polyacrylic acid, polyacrylic acid copolymer, polybutyric acid, polybutyric acid copolymer, maleic anhydride copolymer, polyethyleneimine, polyimideamide, polymethylene lymide derivatives, quaternized polyacrylamide, polydimethylamine cyclopropane, polyvinyl alcohol, polyvinyl alcohol esterification products, polyvinyl alcohol acetalization products, or polyethylene oxide-propylene oxide. The substrate-free adhesive film using the above-mentioned polymer surfactants has better layering effect.

In some embodiments, the styrene-isoprene-styrene (SIS) rubber in the first functional layer 102 includes one or more of styrene-butadiene rubber, nitrile rubber, butyl rubber, chloroprene rubber, polysulfide rubber, polyurethane rubber, polyacrylate rubber, chlorosulfonated polyethylene rubber, silicone rubber, fluorine rubber, butadiene rubber, isoprene rubber, or ethylene propylene rubber.

In some embodiments, the composition in the first functional layer 102 may be determined through Fourier transform infrared spectroscopy. In this specification, the composition of the first functional layer 102 is determined in accordance with the standard GB/T 21186-2007, in which a special prism (for example, a KRS-5 prism made of TlBr and TLI, which is transparent above 250 cm$^{-1}$) is used. A sample is clamped on two sides of the prism, and an incident light reaches a detector after multiple reflections in the sample and prism. The depth the incident light reaching a surface of the sample is related to an incident wavelength, an angle of incidence, and refractive indexes of the prism and the sample. In some embodiments, the composition in the first functional layer 102 can be determined based on a position and intensity of an absorption peak detected by the detector. In some embodiments, based on the standard GB/T 21186-2007, the first functional layer of this application can show characteristic absorption peaks in the ranges of 100 cm$^{-1}$ to 1700 cm$^{-1}$ (methyl CH3 at 1450 cm$^{-1}$, methylene CH2 at 1465 cm$^{-1}$, methine CH at 1340 cm$^{-1}$, sulfate ester salt at 1270 cm$^{-1}$, sulfonate at 1200 cm$^{-1}$, fatty acid salt at 1430 cm$^{-1}$ and 1560 cm$^{-1}$, sulfate ester salt at 1220 cm$^{-1}$ and 1100 cm$^{-1}$, hydroxyl group at 1100 cm$^{-1}$, and carbonyl at 1700 cm$^{-1}$), 2000 cm$^{-1}$ to 2800 cm$^{-1}$ (carboxyl group at 2700 cm$^{-1}$), and 3000 cm$^{-1}$ to 3500 cm$^{-1}$ (amide at 3300 cm$^{-1}$, and aliphatic ammonium salt at 3100 cm$^{-1}$).

In some embodiments, the bonding layer 101 may include any suitable bonding material in the art. In some embodiments, the bonding layer 101 includes one or more of acrylic, polypropylene, styrene-isoprene-styrene (SIS) rubber, polyethylene, or polyamide.

Referring to FIG. 1, in some embodiments, the bonding layer 101 has a thickness of 1 μm to 15 μm. In some embodiments, the thickness of the bonding layer 101 can be less than or equal to 3 μm. In some embodiments, the first functional layer 102 has a thickness of 1 μm to 15 μm. In some embodiments, the thickness of the first functional layer 102 can be less than or equal to 5 μm. In some embodiments, the thickness of the first functional layer 102 is greater than the thickness of the bonding layer 101, so as to further reduce the possibility of penetration of the bonding layer 101 into the first functional layer 102. In some embodiments, the adhesive film 10 has a total thickness of 2 μm to 30 μm. In some embodiments, the total thickness of the adhesive film 10 can be less than or equal to 8 μm so as to increase the energy density per unit volume of the electrochemical apparatus. In other embodiments, the total thickness of the adhesive film 10 is approximately, for example, about 2 μm, about 4 μm, about 6 μm, about 8 μm, about 10 μm, about 15 μm, about 20 μm, or about 30 μm, or in a range defined by any two of these values.

In some embodiments, the permeability condition of the bonding layer 101 and the first functional layer 102 can be measured by dyne values on two surfaces. The term "dyne value" herein refers to a surface tension coefficient, which is defined as a force per unit length between two adjacent portions of a liquid/colloid surface that are pulling on each other, and which can be obtained using a dyne pen test. For detailed implementation, refer to the embodiment section below. If the bonding layer 101 penetrates into the first functional layer 102, the compositions of adjacent portions on the surface of the first functional layer 102 will change, resulting in a change of the dyne value of the first functional layer 102. Conversely, if the first functional layer 102 penetrates into the bonding layer 101, the dyne value of the surface of the bonding layer 101 will similarly change. In some embodiments, after the adhesive film 10 is left at room temperature for 12 hours, the dyne values of the bonding layer 101 and the first functional layer surface 102 that are on two sides of the adhesive film 10 do not change significantly. In some embodiments, the dyne value of the first functional layer 102 does not change significantly after heat treatment and/or pressure treatment. In some embodiments, the bonding layer 101 has a dyne value of 30 mN/m to 48 mN/m. In some embodiments, the first functional layer 102 has a dyne value of 30 mN/m to 48 mN/m.

Persons skilled in the art should understand that a coverage of the adhesive film on a surface of its adherent can be adjusted according to a requirement of a specific usage scenario of the adhesive film. In some embodiments, the coverage of the adhesive film on the surface of its adherent is from 10% to 95%.

Referring to FIG. 1, in some embodiments, the adhesive material can further include a release paper 103, where the release paper 103 is provided on a surface of the bonding layer 101 of the adhesive film 10 facing away from the first functional layer 102.

Persons skilled in the art should understand that the release paper 103 in the adhesive material is provided for preventing the surface of the bonding layer 101 from coming into contact with a non-adherent target surface or itself, so as to avoid the bonding layer from sticking to the non-adherent target surface or itself during use of the adhesive material, and the persons skilled in the art may select any suitable release paper material or size in the art according to the actual need. In some embodiments, the release paper may be provided one-sided on any exposed surface of the bonding layer of the adhesive film, for example, but not limited to, a surface of the bonding layer facing away from the first functional layer or a side surface of the bonding layer. In some embodiments, the release paper may be provided on both an exposed surface of the bonding layer of the adhesive film and an exposed surface of the first functional layer, for example, but not limited to, a surface of the first functional layer facing away from the bonding layer or a side surface of the first functional layer. In some embodiments, the release paper may be removed after the adhesive film is disposed. In some embodiments, the release paper includes a single-sided silicone release film or a double-sided silicone release film.

Figure 2:
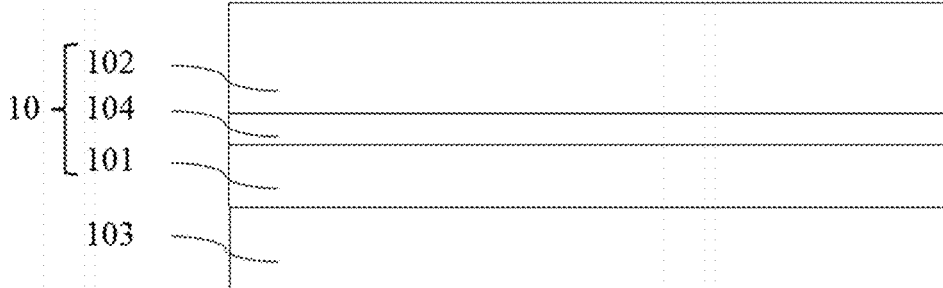
FIG. 2 is a schematic diagram of a cross-sectional structure of an adhesive material according to some other embodiments of this application.

FIG. 2 is a schematic cross-sectional diagram of an adhesive material according to some other embodiments of this application.

As shown in FIG. 2, the adhesive film 10 of the adhesive material provided in some other embodiments of this application further includes a second functional layer 104, where the second functional layer 104 is provided between the bonding layer 101 and the first functional layer 102. The second functional layer 104 is a heat dissipation layer having a relatively high heat conductivity coefficient, and the second functional layer 104 can provide a heat dissipation channel to dissipate the heat generated inside the electrode assembly, thereby eliminating the heat concentration phenomenon in the electrode assembly, avoiding heat accumulation in the electrochemical apparatus, and enhancing the safety of the electrochemical apparatus. In some embodiments, the second functional layer 104 has a higher heat conductivity coefficient than the bonding layer 101 and/or the first functional layer 102.

In some embodiments, the second functional layer 104 includes a heat conduction filler so as to increase the heat conductivity of the second functional layer 104. In some embodiments, the second functional layer 104 may further include a heat conductive gel. Without departing from the spirit of this application, the heat conduction filler and the heat conductive gel may be any suitable material in the art. In some embodiments, the heat conductive gel is polysiloxane. In some embodiments, the heat conduction filler includes one or more of diamond, graphite, graphene, alumina, boron nitride, silicon dioxide, or calcium oxide. Based on a total mass of the second functional layer 104, in some embodiments, a percentage of the heat conduction filler is from 5% to 50%; in some embodiments, the percentage of the heat conduction filler is approximately 5%, 10%, 15%, 20%, 25%, 30%, 35%, 40%, 45%, or 50%, or in a range of values defined by any two of the foregoing values. In some embodiments, the percentage of the heat conduction filler is from 20% to 40%, so as to provide a certain level of heat conductivity while still maintaining a certain bonding strength, making the multi-layer structure of the adhesive film more stable.

In some embodiments, the second functional layer 104 further includes a bonding material, where the bonding material includes one or more of acrylic, polypropylene, styrene-isoprene-styrene (SIS) rubber, polyethylene, or polyamide so as to enhance the structural stability of the second functional layer 104 and the bonding strength of the adhesive film. In some embodiments, based on a total mass of the second functional layer 104, a percentage of the bonding material is 5% to 30%.

In some embodiments, the second functional layer 104 has a thickness of 5 μm to 20 μm.

In some embodiments, the second functional layer 104 can fully cover the bonding layer 101. In some embodiments, the second functional layer 104 can partially cover the bonding layer 101. It should be understood that without departing from the spirit of this application, persons skilled in the art may configure a distribution range of the second functional layer in the adhesive film according to the actual heat dissipation needs. In some embodiments, the distribution of the second functional layer in the adhesive film can be configured according to a heat concentration region corresponding to the electrode assembly.

Figure 3:
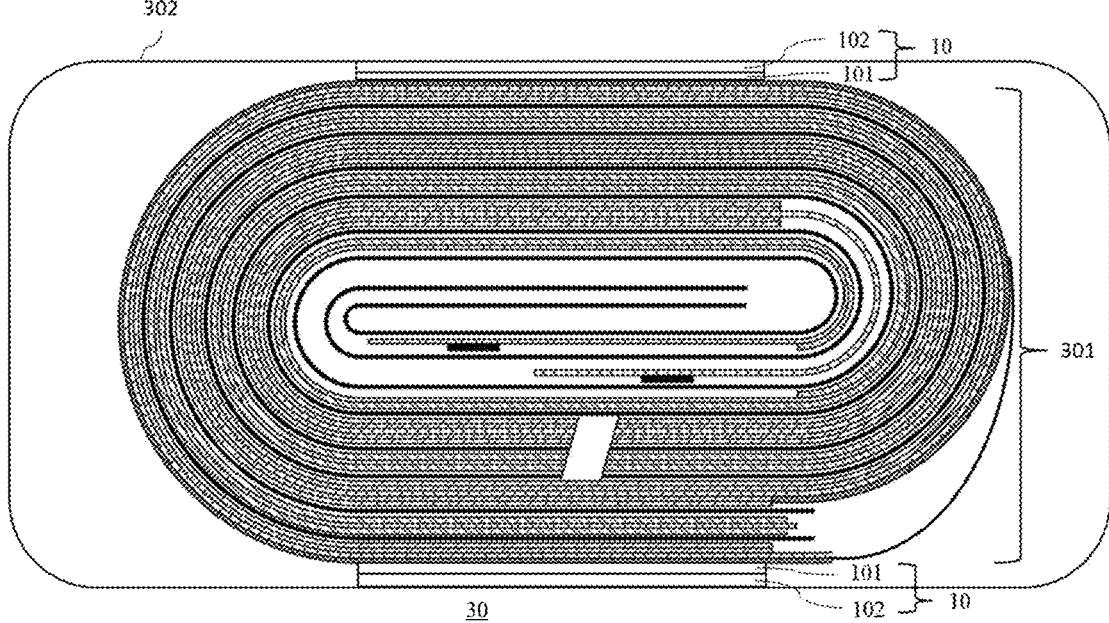
FIG. 3 is a schematic diagram of a cross-sectional structure of an electrochemical apparatus according to some embodiments of this application.

FIG. 3 is a schematic cross-sectional diagram of an electrochemical apparatus according to some embodiments of this application.

As shown in FIG. 3, according to another aspect of this application, some embodiments of this application provide an electrochemical apparatus 30 including an electrode assembly 301, a housing 302, and the adhesive film 10 in the foregoing embodiments, where the bonding layer 101 of the adhesive film 10 is provided on an outer surface of the electrode assembly 301, and the first functional layer 102 of the adhesive film 10 is provided on a surface of the bonding layer facing away from the electrode assembly 301 and is in contact with an inner surface of the housing 302, and the adhesive film 10 fixed the electrode assembly 301 to the housing 302.

In some embodiments, the bonding layer 101 has a bonding strength of 0.05 N/mm to 1.0 N/mm to the outer surface of the electrode assembly 301. In some embodiments, the first functional layer 102 has a bonding strength of 0.05 N/mm to 1.0 N/mm to the inner surface of the housing. In some embodiments, the adhesive film itself can be optimized such that, under the action of an external force, a cohesive failure occurs at an interface between the bonding layer and the first functional layer, to further improve the protection of the adhesive film on the outer surface of the electrode assembly 301 and the inner surface of the housing 302.

In some embodiments, the housing is a soft-cover type aluminum-plastic film. It should be understood that the housing 302 may be any common packaging structure for the electrochemical apparatus in the art, without departing from the spirit of this application. In some embodiments, the housing is a square aluminum shell or a cylindrical aluminum shell.

In some embodiments, the electrode assembly includes a positive electrode, a separator, and a negative electrode. It should be understood that although the embodiment in FIG. 3 utilizes a wound electrode assembly, without departing from the spirit of this application, the electrode assembly in this application may be any suitable electrode assembly in the art without being limited thereto. In some embodiments, the electrode assembly can be a laminated structure or a multi-tab structure. In some embodiments, the electrochemical apparatus is a lithium-ion battery.

In some embodiments, the positive electrode includes a positive electrode current collector and a positive electrode active material layer. The positive electrode current collector may be an aluminum foil or a nickel foil, however, other positive electrode current collectors commonly used in the art may be used without limitation. In some embodiments, the positive electrode active material layer includes a positive electrode active material capable of absorbing and releasing lithium (Li) (hereinafter, sometimes referred to as "positive electrode active material capable of absorbing/releasing lithium Li"). Examples of the positive electrode active material capable of absorbing/releasing lithium (Li) may include one or more of lithium cobalt oxide, lithium nickel cobalt manganese oxide, lithium nickel cobalt aluminium oxide, lithium manganate, lithium iron manganese phosphate, lithium vanadium phosphate, lithium vanadyl phosphate, lithium iron phosphate, lithium titanate, and a lithium-rich manganese-based material.

In some embodiments, the positive electrode active material layer may further include at least one of a binder or a conductive agent. The binder includes one or more of polyvinylidene difluoride, a vinylidene fluoride-hexafluoropropylene copolymer, polyamide, polyacrylonitrile, polyacrylate, polyacrylic acid, polyacrylate, sodium carboxymethyl cellulose, polyvinylpyrrolidone, polyvinyl ether, polymethyl methacrylate, polytetrafluoroethylene, and polyhexafluoropropylene. The conductive agent includes one or more of carbon nanotubes, conductive carbon black, acetylene black, graphene, and Ketjen black. It should be understood that persons skilled in the art may select a conventional binder and conductive agent in the art according to actual needs without being limited thereto.

In some embodiments, the negative electrode includes a negative electrode current collector and a negative electrode active material layer. The negative electrode current collector may be a copper foil or a nickel foil, however, other negative electrode current collectors commonly used in the art may be used without limitation. In some embodiments, the negative electrode active material layer includes a negative electrode active material capable of absorbing and releasing lithium (Li), which includes, but is not limited to, one or more of a carbon material, a metal compound, an oxide, a sulfide, lithium nitride such as LiN3, a lithium metal, metallic and semi-metallic elements that form alloys with lithium, a polymeric material, and a combination thereof. In some embodiments, the negative electrode active material layer may further include at least one of a binder or a conductive agent. The conductive agent and binder of the negative electrode active material layer are similar to the conductive agent and binder of the positive electrode active material layer described above and will not be repeated herein.

In some embodiments, the separator includes but is not limited to at least one of polyethylene, polypropylene, polyethylene terephthalate, polyimide, and aramid. For example, polyethylene includes at least one composition selected from high-density polyethylene, low-density polyethylene, and ultra-high-molecular-weight polyethylene. In particular, polyethylene and polypropylene can well prevent a short circuit, and can improve stability of a battery through a shutdown effect. It should be understood that persons skilled in the art may select the conventional separator in the art according to actual needs without being limited thereto.

The electrochemical apparatus of this application further includes an electrolyte, where the electrolyte includes a lithium salt and a non-aqueous solvent.

In some embodiments, the lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, or lithium difluoroborate. For example, $LiPF_6$ may be selected as the lithium salt because it can provide high ionic conductivity and improve the cycling performance.

The non-aqueous solvent may be a carbonate compound, a carboxylate compound, an ether compound, another organic solvent, or any combination thereof.

The carbonate compound may be a linear carbonate compound, a cyclic carbonate compound, a fluorocarbonate compound, or any combination thereof.

An example of the another organic solvent is dimethyl sulfoxide, 1,2-dioxolane, sulfolane, methyl-sulfolane, 1,3-dimethyl-2-imidazolidinone, N-methyl-2-pyrrolidone, methylamide, dimethylformamide, acetonitrile, trimethyl phosphate, triethyl phosphate, trioctyl phosphate, phosphate ester, or any combination thereof.

In some embodiments, the non-aqueous solvent is selected from vinyl carbonate, propylene carbonate, diethyl carbonate, dimethyl carbonate, methyl ethyl carbonate, propylene carbonate, methyl acetate, ethyl propionate, vinyl fluorocarbonate, and a group consisting of any combination thereof.

In some embodiments, the non-aqueous solvent is a mixture of dioxane (DOL) and dimethyl ether (DME) in a volume ratio of 0.5 to 2.

It should be understood that, without departing from the spirit of this application, the methods for preparing a positive electrode, a negative electrode, a separator, and an electrolyte in some embodiments of this application may be selected from any suitable conventional method in the art according to the specific needs without being limited thereto. In an embodiment of the method for manufacturing an electrochemical apparatus, the method for preparing a lithium-ion battery includes: sequentially winding and folding or stacking the negative electrode, the separator, and the positive electrode into an electrode assembly, adhering an adhesive film in the adhesive material in the foregoing embodiment to an outer surface of the electrode assembly via a bonding layer, subsequently loading the electrode assembly adhered to the adhesive film into a housing, for example, an aluminum-plastic film, injecting an electrolyte into the housing, subsequently performing a heat-pressure process on the lithium-ion battery housing having the electrode assembly installed to bond the adhesive film on the outer surface of the electrode assembly to the inner surface of the housing, followed by processes such as vacuum packaging, standing, formation, and shaping, to obtain the lithium-ion battery.

Although the lithium-ion battery is used as an example for description above, after reading this application, those skilled in the art can figure out that the adhesive film of the adhesive material according to this application can be applied to other appropriate electrochemical apparatuses. Such electrochemical apparatus includes any apparatus in which an electrochemical reaction takes place. Specific examples of the apparatus include all types of primary batteries, secondary batteries, fuel batteries, solar batteries, or capacitors. Especially, the electrochemical apparatus is a lithium secondary battery, including a lithium metal secondary battery, a lithium-ion secondary battery, a lithium polymer secondary battery, or a lithium-ion polymer secondary battery.

Some embodiments of this application further provide an electronic apparatus, where the electronic apparatus includes the electrochemical apparatus in the embodiments of this application.

The electronic apparatus in the embodiments of this application is not particularly limited, and may be any known electronic apparatus used in the prior art. In some embodiments, the electrochemical apparatus may include, but is not limited to, a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notebook, a calculator, a memory card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, a lithium-ion capacitor, or the like.

EXAMPLES

Some specific examples and comparative examples and the test methods and results of GB/T2792-2014 peel strength test, dyne value test, GB/T21186-2007 Fourier transform infrared spectroscopy test, thickness-thinning test, drop performance test, and heat dissipation test on the electrochemical apparatuses (lithium-ion batteries) are listed below so as to better illustrate the technical solutions of this application.

I. Test Methods 1.1 GB/T2792-2014 Peel Strength Test

A Gotech tensile machine (ASR-1021, Guangdong Aisry Instrument Technology Co., Ltd.) was used to stick an object under test on an aluminum foil, which was cut into strip specimens of 20 mm*60 mm, where the length and width values could be adjusted proportionally according to the actual situation; along a length direction of the object under test, a surface of the sample used to detect a bonding strength to the object under test was adhered to a steel plate through a strong adhesive, where an adhesion length was not less than 40 mm; the steel plate was fixed at a corresponding position of the Gotech tensile machine, the other end of the specimen which was not adhered to the steel plate was pulled up, and the specimen was engaged to the sample surface on the steel plate by clamping it into the collet chuck through a connecting object or directly clamping it into the collet chuck, where an included angle of the portion of the pulled-up specimen and the steel plate was 180° in space. The collet chuck was pulled to pull the object under test at a speed of 50 mm/min, and an average value of tensile force in the stationary region was finally measured and recorded as the bonding strength.

1.2 Dyne Value Test

A dyne test pen was used for testing. The dyne test pen was perpendicular to a surface of the object under test, and a straight line was drawn equably on the surface. After 2 seconds to 3 seconds, it was observed whether the straight line shrank and condensed into a bead. Judgment method: (1) If the drawn line was evenly distributed and did not produce any bead, the surface tension of the object under test was higher than a value indicated on the dyne pen; (2) if the drawn line slowly shrank, it meant that the surface tension of the object under test was a little lower than the value indicated on the dyne pen; and (3) if the drawn line shrank immediately and a bead was formed, it meant that the surface tension of the object under test was much lower than the value indicated on the dyne pen. According to the preceding judgment method, dyne test pens with different dyne values were changed continuously until the closest dyne value was obtained as the dyne value of the object under test.

1.3 GB/T21186-2007 Fourier Transform Infrared Spectroscopy Test

A Fourier transform infrared spectrometer (Nicolet iS50, Thermo Fisher) was used to test the Fourier transform infrared spectrum of the object under test. The attenuated total reflection (ATR) could be used for the determination of the infrared spectra in the depth direction and on the surface of the sample. A special prism (KRS-5 prism made of TlBr and TLI transparent above 250 $cm^{-1}$) was used, the object under test was clamped on two sides of the prism, and the incident light reaches a detector after being reflected for multiple times in the object under test and the prism. The depth the incident light reaching the surface of the object under test was related to an incident wavelength, an angle of incidence, and refractive indexes of the prism and the object under test. The absorption wavelength of the incident light reaching the detector was recorded, and the intensity and position of the absorption wavelength were used to determine the composition of the object under test.

1.4 1.8 m Drop Test 10 electrochemical apparatuses (lithium-ion batteries) under test were taken, charged to the full charging voltage at room temperature at a constant current of 0.5 C, charged to a current of 0.05 C at a constant voltage until they were in a fully charged state, and then the voltages of lithium-ion batteries were adjusted to 68% SOC; the voltage and the internal resistance of the lithium-ion batteries were measured, ensuring that the voltages of the lithium-ion batteries were 3.94 V to 3.99 V; a constant voltage test machine and drop special metal or plastic mold (shape and size imitated a real cell phone) were used, the lithium-ion batteries were put into the constant voltage test machine, compression was immediately (within 1 minute) performed after the test machine tightly attached the lithium-ion batteries, and the lithium-ion batteries were compressed for 7 seconds with a 5 kg pressure block; the lithium-ion batteries were left standing for 1 hour, and the voltage and internal resistance were measured again; the appearances of the batteries were checked for damage, leakage, expansion, corrosion, and the like; and then the drop special metal or plastic mold was covered well and screwed in place to complete the drop test preparation.

Manual drop test was selected: according to the following order, the batteries were dropped freely from 1.8 m height in 6 directions: head→tail→head right corner→tail right corner→head left corner→tail left corner (angle: 45±15 degrees) for 7 rounds. After each round of test, if there was any electrolyte leakage, heat, smoke, or fire, the drop test was stopped; and at the end of the drop cycle, if there was no such situation, the battery was regarded as passing the drop test. The lithium-ion batteries was removed after the drop test and was left standing at room temperature for 24 h, and the voltage and internal resistance were measured and whether the discharge voltage of the lithium-ion battery dropped beyond 50 mV was recorded.

1.5 Ultimate Number of 1.0 m Drops 10 electrochemical apparatuses (lithium-ion batteries) under test were taken, charged to the full charging voltage at room temperature at a constant current of 0.5 C, charged to a current of 0.05 C at a constant voltage until they were in a fully charged state, and then the voltages of lithium-ion batteries were adjusted to 68% SOC; the voltage and the internal resistance of the lithium-ion batteries were measured, ensuring that the voltages of the lithium-ion batteries were 3.94 V to 3.99 V; a constant voltage test machine and drop special metal or plastic mold (shape and size imitated a real cell phone) were used, the lithium-ion batteries were put into the constant voltage test machine, compression was immediately (within 1 minute) performed after the test machine tightly attached the lithium-ion batteries, and the lithium-ion batteries were compressed for 7 seconds with a 5 kg pressure block; the lithium-ion batteries were left standing for 1 hour, and the voltage and internal resistance were measured again; the appearances of the batteries were checked for damage, leakage, expansion, corrosion, and the like; and then the drop special metal or plastic mold was covered well and screwed in place to complete the drop test preparation.

Manual drop test was selected: according to the following order, the batteries were dropped freely from 1 m height in 6 directions: head→tail→head right corner→tail right corner→head left corner→tail left corner (angle: 45±15 degrees), and the drop test was stopped if electrolyte leakage, heat, smoke, fire, and voltage drop more than 50 m V was found, and the ultimate number of Im drops was recorded.

1.6 Heat Dissipation Test

Thermocouples were implanted inside the electrochemical apparatus (lithium-ion battery) under test, where wires used for two miniature thermocouples had a diameter of 80 µm, one miniature thermocouple was implanted in the center of the electrode assembly, and the other was placed at the interface between the electrode assembly and the housing. In addition, a thermocouple was affixed to the outer surface of the pouch battery to monitor the temperature of the battery surface. The lithium-ion battery was first discharged to 2.8 V at 0.5 C and then left standing for 30 minutes. The battery was charged to full charge voltage at a constant current of 0.5 C in a room temperature environment, and charged to a current of 0.05 C at a constant voltage. Subsequently the battery was placed horizontally in a temperature chamber with the thermocouple facing upwards and the temperature changes were recorded for different charge/discharge rates of 1 C and 7 C.

II. Preparation Method

2.1. Preparation of Positive Electrode

A positive electrode active material lithium cobalt oxide (LiCoO₂), conductive carbon black (Super P), and polyvinylidene difluoride (PVDF) were mixed at a weight ratio of 97.5:1.0:1.5, with N-methylpyrrolidone (NMP) added as a solvent, so as to prepare a slurry with a solid content of 75%, where the slurry was stirred uniform. The slurry was uniformly applied on a positive electrode current collector aluminum foil and then dried at 90° C. Subsequently, the positive electrode was obtained after cold pressing, cutting, and slitting processes.

2.2 Preparation of Electrolyte

In an environment with a water content of less than 150 ppm (in a dry argon atmosphere), lithium salt LiPF₆ and a non-aqueous organic solvent (a mass ratio of ethylene carbonate (EC) to diethyl carbonate (DEC) to propylene carbonate (PC) to propyl propionate (PP) to vinylene carbonate (VC) was equal to 20:30:20:28:2) were mixed at a mass ratio of 8:92, and the prepared solution was used as an electrolyte of the lithium-ion battery.

2.3 Preparation of Negative Electrode

Copper foil was used as a negative electrode current collector; a layer of graphite slurry was evenly applied on the surface of the copper foil, where the slurry was consisted of a combination of 97.7 wt % artificial graphite, 1.3 wt % sodium carboxymethylcellulose (CMC-Na), and 1.0 wt % styrene-butadiene rubber (SBR); and the copper foil with the slurry applied was dried at 90° C. After cold pressing, cutting, and slitting, drying was performed in vacuum at 85° C. for 4 h to obtain a negative electrode.

2.4 Preparation of Lithium-Ion Battery

A polyethylene film was used as the separator, where the thickness of the polyethylene film was 15 µm; and the positive electrode, the separator, and the negative electrode were stacked sequentially, such that the separator was in the middle of the positive electrode and the negative electrode for separation. The stacked electrode assembly was dewatered at 80° C. to obtain a dry electrode assembly, and lithium-ion batteries were prepared according to the following examples.

Example 1

Acrylic was used as a bonding layer material, and styrene-isoprene-styrene rubber was used to be mixed with an additive to prepare a first functional layer slurry, where the types and ratios of the styrene-isoprene-styrene rubber and a polypropylene wax were shown in the table of the following examples. The bonding layer material was applied on a release paper to prepare a bonding layer, and the first functional layer slurry was applied on the bonding layer to prepare a first functional layer, where a thickness of the bonding layer was 5 µm and a thickness of the first functional layer was 5 µm.

A substrate-free adhesive film was attached to two sides of the dry electrode assembly, the resulting product was packed into a housing that is an aluminum-plastic film soft-cover packaging bag, with the top side sealed, and the sealed product was subjected to vacuum baking at 80° C., for 8 h; subsequently, the sealed product was injected with the electrolyte, followed by the processes of chemical formation, capacity testing, and pumping, and then a square soft-packed lithium-ion battery with a thickness/width/height of 5.2 mm, 63 mm, and 76 mm was prepared.

Examples 2 to 11

The preparation methods were substantially the same as those of Example 1, except that the type of styrene-isoprene-styrene rubber in the first functional layer slurry and/or the ratio of styrene-isoprene-styrene rubber to the additive were different. For details, refer to the following example table.

Examples 12 to 15

The preparation methods were substantially the same as those of Example 3, except that the type of additive in the first functional layer slurry was different. For details, refer to the following example table.

Examples 16 to 18

The preparation methods were substantially the same as those of Example 3, except that the thickness of the first functional layer was different. For details, refer to Table 1.

Examples 19 to 22

The preparation methods were substantially the same as those of Example 3, except that the bonding material of the bonding layer was different. For details, refer to Table 2.

Examples 23 and 24

The preparation methods were substantially the same as those of Example 3, except that the thickness of the bonding layer was different. For details, refer to Table 2.

Example 25

The preparation method was substantially the same as that of Example 3, except that in the adhesive material of Example 25, after the bonding layer was prepared, a second functional layer coating was further prepared by mixing 50 wt % of the heat conductive gel, 40 wt % of the thermal conductive filler, and 10 wt % of the binder, where the types and proportions of the heat conductive gel, the heat conduction filler, and the binder were shown in Table 3. Subsequently, the second functional layer coating was applied to the bonding layer to prepare the second functional layer, and the first functional layer slurry was applied to the second functional layer to prepare the first functional layer, where the thickness of the bonding layer was 5 μm, the thickness of the first functional layer was 5 μm, and the thickness of the second functional layer was 10 μm.

Examples 26 to 36

The preparation methods were substantially the same as those of Example 25, except that the types or proportions of the heat conductive gel, or the binder were different. For details, refer to Table 3.

Examples 37 to 39

The preparation methods were substantially the same as those of Example 25, except that the thickness of the second functional layer was different. For details, refer to Table 3.

Comparative Examples 1 to 3

The preparation methods were substantially the same as those of Example 1, except that only styrene-isoprene-styrene rubber was used in the preparation of the first functional layer slurry, and the thickness of the first functional layer was different. For details, refer to Table 1.

Comparative Example 4

A general commercial double-sided tape was used as the adhesive material. The double-sided tape was attached to two sides of the electrode assembly, the resulting product was packed into a housing that is an aluminum-plastic film soft-cover packaging bag, with the top side sealed, and the sealed product was subjected to vacuum baking at 80° C. for 8 h; subsequently, the sealed product was injected with the electrolyte, followed by the processes of chemical formation, capacity testing, and pumping, and then a square soft-packed lithium-ion battery with a thickness/width/height of 5.2 mm, 63 mm, and 76 mm was prepared.

Comparative Example 5

The preparation method was substantially the same as that of Comparative Example 4, except that the double-sided tape was adhered to only one side of the electrode assembly.

Comparative Example 6

The preparation method was substantially the same as that of Comparative Example 5, except that the double-sided tape was adhered to only another side of the electrode assembly.

III. Comparative Results

3.1 Comparison of Composition of Substrate-Free Adhesive Film

A difference between the lithium-ion batteries of Examples 1 to 15 and the lithium-ion batteries of Comparative Examples 1 to 6 is that the composition of the adhesive film or the first functional layer of the adhesive film used therein is different, where the structural parameters of the first functional layer are documented in Table 1 below along with the results of the bonding strength test, the dyne test, and the drop test.

TABLE 1

| Example/ Comparative Example | Composition and percentage of styrene-isoprene-styrene rubber in the first functional layer | Composition and percentage of additive in the first functional layer | Bonding strength of the first functional layer at a 25° C. room temperature (N/mm) | Bonding strength of the first functional layer after heat-pressure treatment (N/mm) | Dyne value of surface of the first functional layer (dyn/cm) | Ultimate number of 1.0 m drops | Proportion of voltage drop less than 50 mV | 1.8 m drop test pass rate |
|---|---|---|---|---|---|---|---|---|
| Example 1 | 95% butyl rubber | 5% polypropylene wax | 0.010 | 0.412 | 30 | 26 | 10/10 | 10/10 |

TABLE 1-continued

| Example/ Comparative Example | Composition and percentage of styrene-isoprene-styrene rubber in the first functional layer | Composition and percentage of additive in the first functional layer | Bonding strength of the first functional layer at a 25° C. room temperature (N/mm) | Bonding strength of the first functional layer after heat-pressure treatment (N/mm) | Dyne value of surface of the first functional layer (dyn/cm) | Ultimate number of 1.0 m drops | Proportion of voltage drop less than 50 mV | 1.8 m drop test pass rate |
|---|---|---|---|---|---|---|---|---|
| Example 2 | 96% butyl rubber | 4% polypropylene wax | 0.020 | 0.489 | 30 | 29 | 10/10 | 10/10 |
| Example 3 | 97% butyl rubber | 3% polypropylene wax | 0.030 | 0.511 | 32 | 29 | 10/10 | 10/10 |
| Example 4 | 98.5% butyl rubber | 1.5% polypropylene wax | 0.035 | 0.499 | 36 | 27 | 10/10 | 10/10 |
| Example 5 | 99.5% butyl rubber | 0.5% polypropylene wax | 0.040 | 0.478 | 48 | 25 | 10/10 | 10/10 |
| Example 6 | 99.8% butyl rubber | 0.2% polypropylene wax | 0.053 | 0.478 | 56 | 21 | 9/10 | 10/10 |
| Example 7 | 94% butyl rubber | 6% polypropylene wax | 0.012 | 0.491 | 30 | 23 | 10/10 | 10/10 |
| Example 8 | 97% nitrile rubber | 3% polypropylene wax | 0.028 | 0.511 | 32 | 27 | 10/10 | 10/10 |
| Example 9 | 97% chloroprene rubber | 3% polypropylene wax | 0.027 | 0.536 | 32 | 28 | 10/10 | 10/10 |
| Example 10 | 97% butadiene rubber | 3% polypropylene wax | 0.035 | 0.495 | 32 | 32 | 10/10 | 10/10 |
| Example 11 | 97% styrene-butadiene rubber | 3% polypropylene wax | 0.032 | 0.483 | 32 | 26 | 10/10 | 10/10 |
| Example 12 | 97% butyl rubber | 3% polyethylene wax | 0.031 | 0.487 | 32 | 31 | 10/10 | 10/10 |
| Example 13 | 97% butyl rubber | 3% sasol wax | 0.026 | 0.504 | 32 | 29 | 10/10 | 10/10 |
| Example 14 | 97% butyl rubber | 3% maleic anhydride copolymer | 0.028 | 0.532 | 32 | 28 | 10/10 | 10/10 |
| Example 15 | 97% butyl rubber | 3% polyacrylic acid copolymer | 0.030 | 0.545 | 32 | 25 | 10/10 | 10/10 |
| Comparative Example 1 | 100% butyl rubber | N/A | 0.060 | 0.507 | 60 | 17 | 8/10 | 8/10 |
| Comparative Example 2 | 100% butyl rubber | N/A | 0.062 | 0.629 | 60 | 15 | 7/10 | 8/10 |
| Comparative Example 3 | 100% butyl rubber | N/A | 0.067 | 0.705 | 60 | 14 | 8/10 | 7/10 |
| Comparative Example 4 | N/A | N/A | N/A | N/A | N/A | 18 | 8/10 | 8/10 |
| Comparative Example 5 | N/A | N/A | N/A | N/A | N/A | 16 | 7/10 | 7/10 |
| Comparative Example 6 | N/A | N/A | N/A | N/A | N/A | 17 | 7/10 | 6/10 |

It can be seen from Table 1 that in this application, adding an additive including a wax or a polymer surfactant to the first functional layer of the substrate-free adhesive film can effectively regulate the bonding strength of the first functional layer, such that it has different bonding strengths at room temperature and after hot-pressing treatment to optimize the packaging process of the electrode assembly. In addition, the adhesive film of some embodiments of this application with the additive can make the dyne value of the surface of its first functional layer within a certain range, so as to maintain the interface between the first functional layer and the bonding layer, and to avoid permeation between the first functional layer and the bonding layer, which in turn makes the adhesive film capable of releasing the stresses through cohesive failure at the interface between the first functional layer and the bonding layer when being subjected to an external force, so as to improve its performance in the drop test. Referring to Examples 1 to 15 and Comparative Examples 1 to 6, the first functional layer with a certain content of additive in the examples can effectively adjust the surface adhesion after the heat-pressure treatment, avoiding damage to the surface of the electrode assembly or the housing caused by excessive viscosity; and can maintain the dyne value of the first functional layer, so as to optimize the processing needs of the lithium-ion battery. The lithium-ion battery of this application using a substrate-free adhesive film can maintain a stable voltage output in the vast majority of cases even after being subjected to an external shock.

Examples 23 and 24 is that the thicknesses of the first functional layers and/or the bonding layers of the adhesive films are different, where the thickness of the first functional layer, the thickness of the bonding layer, the material of the bonding layer, and the results of the bonding test and the drop test of the lithium-ion batteries are documented in Table 2 below.

TABLE 2

| Example/ Comparative Example | Composition of the bonding layer | Bonding strength of the layer to the outer surface of the electrode assembly (N/mm) | Thickness of the bonding layer (μm) | Thickness of the first functional layer (μm) | Ultimate number of 1.0 m drops | Proportion of voltage drop less than 50 mV | 1.8 m drop test pass rate |
|---|---|---|---|---|---|---|---|
| Example 3 | Acrylic | 0.302 | 5 | 5 | 26 | 10/10 | 10/10 |
| Example 16 | Acrylic | 0.302 | 5 | 7 | 24 | 10/10 | 10/10 |
| Example 17 | Acrylic | 0.302 | 5 | 10 | 26 | 10/10 | 10/10 |
| Example 18 | Acrylic | 0.302 | 5 | 15 | 22 | 10/10 | 10/10 |
| Example 19 | Polypropylene | 0.286 | 5 | 5 | 23 | 10/10 | 10/10 |
| Example 20 | SIS rubber | 0.317 | 5 | 5 | 26 | 10/10 | 10/10 |
| Example 21 | Polyethylene | 0.321 | 5 | 5 | 29 | 10/10 | 10/10 |
| Example 22 | Polyamide | 0.305 | 5 | 5 | 30 | 10/10 | 10/10 |
| Example 23 | Acrylic | 0.085 | 1 | 5 | 18 | 7/10 | 9/10 |
| Example 24 | Acrylic | 0.267 | 4 | 5 | 21 | 9/10 | 10/10 |

Comparing Examples 1 to 6 with Comparative Example 1, it can be seen that adjusting the proportion of additive in the first functional layer of the substrate-free adhesive film of this application can change the surface dyne value of the first functional layer, which affects the interfacial stability of the first functional layer and the bonding layer, and thus affects its drop test performance. With reference to Examples 1 to 5, it can be seen that the adhesive film within the mass ratio range of the additive provided in some embodiments of this application has a dyne value ranging from 30 dyn/cm to 48 dyn/cm, and the interface between the first functional layer and the bonding layer is more stable, and the lithium-ion battery thereof has a better drop test performance.

Comparing Example 3 with Comparative Examples 4 to 6, compared with lithium-ion batteries using general double-sided tape, the lithium-ion battery of this application can prevent the housing from being damaged, catching fire, or leaking after being subjected to a strong external impact, so it can be seen that lithium-ion battery using a substrate-free adhesive film in this application can effectively improve its safety performance against a strong external impact. It can be seen from the 1 m ultimate drop test results, the number of drops that the lithium-ion battery of this application can withstand is much higher than that of lithium-ion batteries using general double-sided tape in the comparative examples. It can be seen that this application can still effectively improve safety performance of the lithium-ion battery under relatively low external force impact.

3.2 Comparison of Thickness of Substrate-Free Adhesive Film

A difference between the lithium-ion battery of Example 3 and the lithium-ion batteries of Examples 16 to 18 and Referring to Table 2 and comparing Examples 3, 16 to 18, and 23 and 24, it can be seen that if the thickness of the first functional layer or the bonding layer in the adhesive film of the substrate-free adhesive film of some embodiments of this application is too low, the bonding strength decreases, and the maintenance of the interface between the first functional layer and the bonding layer is affected, such that the adhesive film cannot release the stress through cohesive failure at the interface, which in turn affects its performance in the drop test. In the examples, in the lithium-ion battery in which the thickness of the first functional layer is greater than or equal to the thickness of the bonding layer, the interface between the first functional layer and the bonding layer of adhesive film is better maintained, and drop test performance is better. Comparing Example 3 with Examples 19 to 22, it can be seen that the bonding strength of the bonding layer on the outer surface of the electrode assembly in some embodiments of this application is affected by its material and thickness, in other words, the bonding strength of the bonding layer on the outer surface of the electrode assembly can be altered by adjusting the thickness and the bonding material of the bonding layer.

3.3 Effect of Heat Dissipation Test

A difference between the lithium-ion battery of Example 3 and the lithium-ion batteries of Examples 25 to 39 is whether or not the adhesive film also has a second functional layer, where the thickness of the second functional layer, the constituent materials of the second functional layer and its bonding strength test results, and the results of the drop test and the heat dissipation test of the lithium-ion battery are documented in Table 3 below.

TABLE 3

| Example Comparative Example | Composition and percentage of heat conductive gel in the second functional layer | Composition and percentage of heat conduction filler in the second functional layer | Composition and percentage of binder in the second functional layer | Thickness of the second functional layer (μm) | Ultimate number of 1.0 m drops | Proportion of voltage drop less than 50 mV | 1.8 m drop test pass rate | Lifted temperature of electrode assembly at 1 C (° C.) | Lifted temperature of electrode assembly at 7 C (° C.) |
|---|---|---|---|---|---|---|---|---|---|
| Example 3 | N/A | N/A | N/A | N/A | 26 | 10/10 | 10/10 | 0.5 | 23 |
| Example 25 | 50% polysiloxane | 50% graphene | 10% polypropylene | 10 | 30 | 9/10 | 9/10 | 0.100 | 10.0 |
| Example 26 | 60% polysiloxane | 40% graphene | 10% polypropylene | 10 | 29 | 10/10 | 10/10 | 0.120 | 11.30 |
| Example 27 | 70% polysiloxane | 20% graphene | 10% polypropylene | 10 | 32 | 10/10 | 10/10 | 0.150 | 12.5 |
| Example 28 | 80% polysiloxane | 5% graphene | 10% polypropylene | 10 | 26 | 10/10 | 10/10 | 0.185 | 13.7 |
| Example 29 | 70% polysiloxane | 20% graphene | 10% acrylic | 10 | 24 | 10/10 | 10/10 | 0.142 | 12.4 |
| Example 30 | 70% polysiloxane | 20% graphene | 10% SIS rubber | 10 | 25 | 10/10 | 10/10 | 0.140 | 12.65 |
| Example 31 | 70% polysiloxane | 20% graphene | 10% polyethylene | 10 | 25 | 10/10 | 10/10 | 0.142 | 12.68 |
| Example 32 | 70% polysiloxane | 20% graphene | 10% polyamide | 10 | 28 | 10/10 | 10/10 | 0.149 | 12.43 |
| Example 33 | 70% polysiloxane | 20% aluminum oxide | 10% polypropylene | 10 | 26 | 10/10 | 10/10 | 0.220 | 12.89 |
| Example 34 | 70% polysiloxane | 20% diamond | 10% polypropylene | 10 | 24 | 10/10 | 10/10 | 0.215 | 12.85 |
| Example 35 | 70% polysiloxane | 20% boron nitride | 10% polypropylene | 10 | 27 | 10/10 | 10/10 | 0.240 | 12.99 |
| Example 36 | 70% polysiloxane | 20% silicon dioxide | 10% polypropylene | 10 | 30 | 10/10 | 10/10 | 0.245 | 13.12 |
| Example 37 | 70% polysiloxane | 20% graphene | 10% polypropylene | 5 | 27 | 10/10 | 10/10 | 0.153 | 12.53 |
| Example 38 | 70% polysiloxane | 20% graphene | 10% polypropylene | 15 | 29 | 10/10 | 10/10 | 0.146 | 11.45 |
| Example 39 | 70% polysiloxane | 20% graphene | 10% polypropylene | 20 | 28 | 10/10 | 10/10 | 0.141 | 11.01 |
| Comparative Example 1 | N/A | N/A | N/A | N/A | 19 | 9/10 | 19 | 0.500 | 22.80 |

Referring to Table 5, it can be seen that the substrate-free adhesive film with the second functional layer is used in Examples 25 to 39, which can effectively improve the heat dissipation effect of the lithium-ion battery, and thus effectively reduce the lifted temperature of its electrode assembly during charging, so as to avoid overheating of the battery during charging at a high charging rate. In addition, comparing Example 3 with Examples 25 to 39, it can be seen that some embodiments of this application, with the second functional layer of the substrate-free adhesive film provided, still have good safety performance in the drop test structure of its lithium-ion battery.

In this specification, reference to "an embodiment", "some embodiments", "one embodiment", "another example", "an example", "a specific example", or "some examples" means that at least one embodiment or example in this application includes a specified feature, structure, material, or characteristic described in this embodiment or example. Therefore, descriptions in various places throughout this specification, such as "in some embodiments", "in the embodiments", "in an embodiment", "in another example", "in an example", "in a specified example", or "examples" do not necessarily refer to the same embodiment or example in this application. In addition, a specified feature, structure, material, or characteristic herein may be combined in any appropriate manner in one or more embodiments or examples.

Although illustrative embodiments have been demonstrated and described, persons skilled in the art should understand that the foregoing embodiments cannot be construed as limitations on this application, and that the embodiments may be changed, replaced, and modified without departing from the spirit, principle, and scope of this application.

What is claimed is:

1. An adhesive material, comprising an adhesive film, the adhesive film comprising a bonding layer and a first functional layer, wherein the first functional layer comprises a styrene-isoprene-styrene rubber and an additive, and the additive comprises a wax or a polymer surfactant;

wherein the adhesive film is a substrate-free adhesive film; and wherein a mass percentage of the additive is from 0.5% to 5.0% based on a total mass of the first functional layer.

2. The adhesive material according to claim 1, wherein the first functional layer has a bonding strength of 0.01 N/mm to 0.05 N/mm at 23° C. to 26° C.

3. The adhesive material according to claim 1, wherein the first functional layer has a bonding strength of 0.05 N/mm to 1.0 N/mm after heat-pressure treatment.

4. The adhesive material according to claim 1, further comprising a release paper, wherein the release paper is provided on a surface of the bonding layer facing away from the first functional layer.

5. The adhesive material according to claim 1, the additive comprises the wax.

6. An electrochemical apparatus, comprising:

an electrode assembly;

a housing; and the adhesive film according to claim 1, wherein the bonding layer of the adhesive film is provided on an outer surface of the electrode assembly, the first functional layer of the adhesive film is provided on a surface of the bonding layer facing away from the electrode assembly and is in contact with an inner surface of the housing, and the adhesive film fixes the electrode assembly to the housing.

7. The electrochemical apparatus according to claim 6, wherein the bonding layer has a bonding strength of 0.05 N/mm to 1.0 N/mm to the outer surface of the electrode assembly, and the first functional layer has a bonding strength of 0.05 N/mm to 1.0 N/mm to the inner surface of the housing.

8. The electrochemical apparatus according to claim 6, wherein the mass percentage of the additive is from 1.0% to 4.0%.

9. The electrochemical apparatus according to claim 6, wherein the styrene-isoprene-styrene rubber comprises one or more selected from the group consisting of styrene-butadiene rubber, nitrile rubber, butyl rubber, chloroprene rubber, polysulfide rubber, polyurethane rubber, polyacrylate rubber, chlorosulfonated polyethylene rubber, silicone rubber, fluorine rubber, butadiene rubber, isoprene rubber, and ethylene propylene rubber.

10. The electrochemical apparatus according to claim 6, wherein the wax comprises one or more of paraffin wax, sasol wax, polyethylene wax, or polypropylene wax.

11. The electrochemical apparatus according to claim 6, wherein the polymer surfactant comprises one or more selected from the group consisting of the following components: polyacrylamide, polyacrylamide copolymer, polyacrylic acid, polyacrylic acid copolymer, polybutyric acid, polybutyric acid copolymer, maleic anhydride copolymer, polyethyleneimine, polymaleamide, polymethylene lymide derivatives, quaternized polyacrylamide, polydimethylamine cyclopropane, polyvinyl alcohol, polyvinyl alcohol esterification products, polyvinyl alcohol acetalization products, and polyethylene oxide-propylene oxide.

12. The electrochemical apparatus according to claim 6, wherein the bonding layer comprises one or more selected from the group consisting of acrylic, polypropylene, styrene-isoprene-styrene (SIS) rubber, polyethylene, and polyamide.

13. The electrochemical apparatus according to claim 6, wherein a dyne value of the bonding layer is 30 mN/m to 48 mN/m, and a dyne value of the first functional layer is 30 mN/m to 48 mN/m.

14. The electrochemical apparatus according to claim 6, wherein a thickness of the bonding layer is 1 μm to 15 μm, and a thickness of the first functional layer is 1 μm to 15 μm, wherein the thickness of the first functional layer is greater than or equal to the thickness of the bonding layer.

15. The electrochemical apparatus according to claim 6, wherein the adhesive film further comprises a second functional layer, the second functional layer being provided between the bonding layer and the first functional layer, wherein the second functional layer comprises a heat conduction filler, and a mass ratio of the heat conduction filler is 5% to 50% based on a total mass of the second functional layer.

16. The electrochemical apparatus according to claim 15, wherein the mass ratio of the heat conduction filler is 20% to 40%.

17. The electrochemical apparatus according to claim 15, wherein the heat conduction filler comprises one or more selected from the group consisting of diamond, graphite, graphene, alumina, boron nitride, silicon dioxide, and calcium oxide.

18. The electrochemical apparatus according to claim 15, wherein a thickness of the second functional layer is 5 μm to 20 μm.

* * * * *